(12) United States Patent
Mok et al.

(10) Patent No.: US 7,739,439 B2
(45) Date of Patent: *Jun. 15, 2010

(54) METHOD OF FABRICATION OF A PORTABLE COMPUTER APPARATUS WITH THERMAL ENHANCEMENTS AND MULTIPLE MODES OF OPERATION

(75) Inventors: Lawrence Shungwei Mok, Brewster, NY (US); Daniel Peter Morris, Purchase, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/317,688

(22) Filed: Dec. 26, 2008

(65) Prior Publication Data

US 2009/0113106 A1    Apr. 30, 2009

(51) Int. Cl.
*G06F 13/00* (2006.01)
(52) U.S. Cl. .................. 710/304; 713/324; 713/600; 257/712; 361/687; 165/80.3
(58) Field of Classification Search ............ 710/300, 710/301, 302, 304, 305, 306; 713/300, 310, 713/320, 324, 326, 327, 500, 600, 722; 257/712; 361/687; 165/80.3
See application file for complete search history.

(56) References Cited

U.S. PATENT DOCUMENTS

| | | | | |
|---|---|---|---|---|
| 5,136,693 A | * | 8/1992 | Rice | 710/100 |
| 5,274,791 A | * | 12/1993 | Bracking et al. | 711/5 |
| 5,276,890 A | * | 1/1994 | Arai | 713/323 |
| 5,313,596 A | * | 5/1994 | Swindler et al. | 710/303 |
| 5,323,291 A | * | 6/1994 | Boyle et al. | 361/679.42 |
| 5,383,340 A | * | 1/1995 | Larson et al. | 62/259.2 |
| 5,388,265 A | * | 2/1995 | Volk | 713/322 |
| 5,392,437 A | * | 2/1995 | Matter et al. | 713/324 |
| 5,410,711 A | * | 4/1995 | Stewart | 713/322 |
| 5,428,252 A | * | 6/1995 | Walker et al. | 307/64 |
| 5,471,625 A | * | 11/1995 | Mussemann et al. | 713/322 |
| 5,493,683 A | * | 2/1996 | Cloud et al. | 713/320 |
| 5,511,203 A | * | 4/1996 | Wisor et al. | 713/322 |
| 5,513,359 A | * | 4/1996 | Clark et al. | 713/323 |
| 5,521,854 A | * | 5/1996 | Kadowaki et al. | 713/321 |
| 5,530,879 A | * | 6/1996 | Crump et al. | 713/323 |
| 5,550,710 A | * | 8/1996 | Rahamim et al. | 361/679.41 |
| 5,552,959 A | * | 9/1996 | Penniman et al. | 361/679.41 |
| 5,586,332 A | * | 12/1996 | Jain et al. | 713/322 |
| 5,590,341 A | * | 12/1996 | Matter | 713/320 |
| 5,598,537 A | * | 1/1997 | Swanstrom et al. | 710/304 |
| 5,598,539 A | * | 1/1997 | Gephardt et al. | 710/304 |
| 5,603,036 A | * | 2/1997 | Wells et al. | 713/322 |
| 5,630,052 A | * | 5/1997 | Shah | 714/38 |
| 5,630,142 A | * | 5/1997 | Crump et al. | 713/323 |

(Continued)

*Primary Examiner*—Paul R Myers
(74) *Attorney, Agent, or Firm*—Thomas A. Beck; Daniel P. Morris

(57) ABSTRACT

A portable computer adapted for electrical connection to a docking station having multiple power modes of operation is described. The portable computer has one or more CPU chips which have at least two power modes of operation, a low power mode and a high power mode. When the portable computer is operated as a stand-alone computer, it operates in the low power mode. When the portable computer is operated while electrically connected to the docking station, it operates in a high power mode. The docking station has greater cooling capacity than the portable computer alone to provide enhanced cooling of the high power mode of operation.

1 Claim, 9 Drawing Sheets

U.S. PATENT DOCUMENTS

| | | | |
|---|---|---|---|
| 5,632,020 A * | 5/1997 | Gephardt et al. | 710/304 |
| 5,634,131 A * | 5/1997 | Matter et al. | 713/322 |
| 5,649,213 A * | 7/1997 | Kurihara et al. | 713/323 |
| 5,652,894 A * | 7/1997 | Hu et al. | 713/322 |
| 5,655,125 A * | 8/1997 | Cloud et al. | 713/300 |
| 5,655,127 A * | 8/1997 | Rabe et al. | 713/322 |
| 5,664,118 A * | 9/1997 | Nishigaki et al. | 710/304 |
| 5,664,205 A * | 9/1997 | O'Brien et al. | 713/322 |
| 5,666,537 A * | 9/1997 | Debnath et al. | 713/322 |
| 5,671,422 A * | 9/1997 | Datta | 710/261 |
| 5,696,953 A * | 12/1997 | Wong et al. | 713/601 |
| 5,696,977 A * | 12/1997 | Wells et al. | 713/322 |
| 5,721,837 A * | 2/1998 | Kikinis et al. | 710/303 |
| 5,726,921 A * | 3/1998 | Krick | 713/321 |
| 5,796,581 A * | 8/1998 | Mok | 361/679.27 |
| 5,884,049 A * | 3/1999 | Atkinson | 710/303 |
| 5,969,939 A * | 10/1999 | Moss et al. | 361/679.41 |
| 5,974,556 A * | 10/1999 | Jackson et al. | 713/322 |
| 5,974,557 A * | 10/1999 | Thomas et al. | 713/322 |
| 5,978,215 A * | 11/1999 | Chiu et al. | 361/679.11 |
| 6,008,986 A * | 12/1999 | Mok | 361/679.12 |
| 6,081,901 A * | 6/2000 | Dewa et al. | 713/300 |
| 6,084,769 A * | 7/2000 | Moore et al. | 361/679.47 |
| 6,094,347 A * | 7/2000 | Bhatia | 361/695 |
| 6,191,943 B1 * | 2/2001 | Tracy | 361/679.46 |
| 6,272,642 B2 * | 8/2001 | Pole et al. | 713/300 |
| 6,275,945 B1 * | 8/2001 | Tsuji et al. | 713/300 |
| 6,453,378 B1 * | 9/2002 | Olson et al. | 710/304 |

* cited by examiner

METHOD OF FABRICATION OF A PORTABLE COMPUTER APPARATUS WITH THERMAL ENHANCEMENTS AND MULTIPLE MODES OF OPERATION

FIELD OF INVENTION

The present invention is directed to portable computers having at least two power modes of operation. In particular, an embodiment of the present invention is directed to a portable computer having a high and low power mode of operation and more particularly in association with a docking station wherein the portable computer operates in a lower power mode when not engaged in the docking station and in a high power mode when engaged in the docking station which has cooling systems to cool the high power mode of operation.

BACKGROUND

The power consumption of laptop computers, especially the power of CPUs used in laptop computers is increasing. For instance, the total power of a laptop computer is usually around 10 watts and now it is becoming 20 to 30 W. The CPU power has been increased from 2 to 8 W and in the future could be in the 15 W range and higher. Most of this power will eventually be dissipated as heat to the surroundings. Getting more heat out of the lap-top computer is becoming a critical factor in the laptop computer business.

Portable computers, such as laptop computers, are designed to be compact and small. Thus there is limited space to incorporate cooling systems. Thus portable computers cannot operate using the fastest CPU chips available. This presents a problem when the portable computer is used as a workstation, as a desk top computer or in place of a desk top computer. Typically a portable computer is used as a workstation by inserting the portable computer into a frame, referred to as a docking station. The docking station provides additional functionality to the portable computer, such as additional disk drives and CD drives. The docking station has ports through which a large keyboard and a large screen monitor can be connected to the portable computer. The portable computer when engaged with a docking station and used as a workstation has the disadvantage as compared with a desktop computer of not functioning as fast as the desktop computer. This is because the desktop computer has a cooling system which can cool the desktop computer which has a CPU which runs too hot to be included in the portable computer. Applications running on the portable computer engaged with a docking station have slower performance than the desk-top and some applications either cannot run on the in a portable computer engaged with docking station or run so slow as to be effectively unusable. Applicants invention solves this problem.

A portable computer is intended to be transported around by a user. As described above, the portable computer is commonly used as a workstation by inserting into a docking station. A user typically has a docking station in their office and typically takes the portable computer on business or for use at home. If the user takes the portable computer home and forgets to bring it into the office, the user has no computer to use in the office. This prevents the user from accessing systems such as e-mail, the internet and using word processors. Applicants invention solves this problem.

SUMMARY

A broad aspect of the present invention is a system having: a portable computer; a docking station; the portable computer has a low power mode of operation and a high power mode of operation; and, a sensor for sensing if the portable computer is engaged in the docking station or if the portable computer in not engaged in the docking station.

Another broad aspect of the present invention is a system having: a portable computer; a docking station; the portable computer comprises a low power mode of operation and a high power mode of operation; and, a signal generator for switching the computer between the high power mode of operation and the low power mode of operation.

Another broad aspect of the present invention is a system having: a computer; the computer has a low power mode of operation and a high power mode of operation; and, a signal generator for switching said computer between the high power mode of operation and the low power mode of operation in response to an input.

Another broad aspect of the present invention is a system having: a portable computer; a docking station; the portable computer has a first CPU; the docking station has a second CPU; and the docking station without the portable computer engaged to the docking station is operable through the second CPU.

Another broad aspect of the present invention is a system to increase the cooling capability of a portable computer when it is in a docking base.

BRIEF DESCRIPTION OF THE DRAWINGS

These and other objects, features and advantages of the present invention will become apparent upon a consideration of the following detailed description and the invention when read in conjunction with the drawing Figures, in which.

DETAILED DESCRIPTION

A portable computer is commonly referred to as a laptop computer and both terms will be used interchangeably herein.

Figure 1:
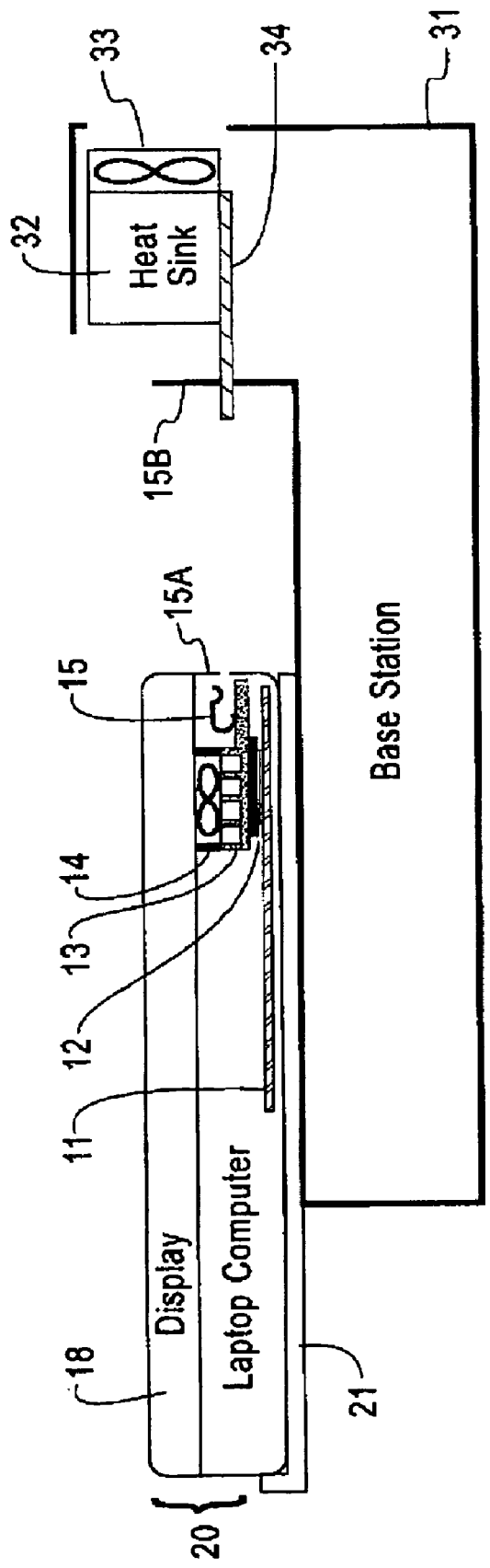
FIG. 1 is the schematic view of a laptop computer sitting on a tray of a docking base waiting to be docked.
Figure 2:
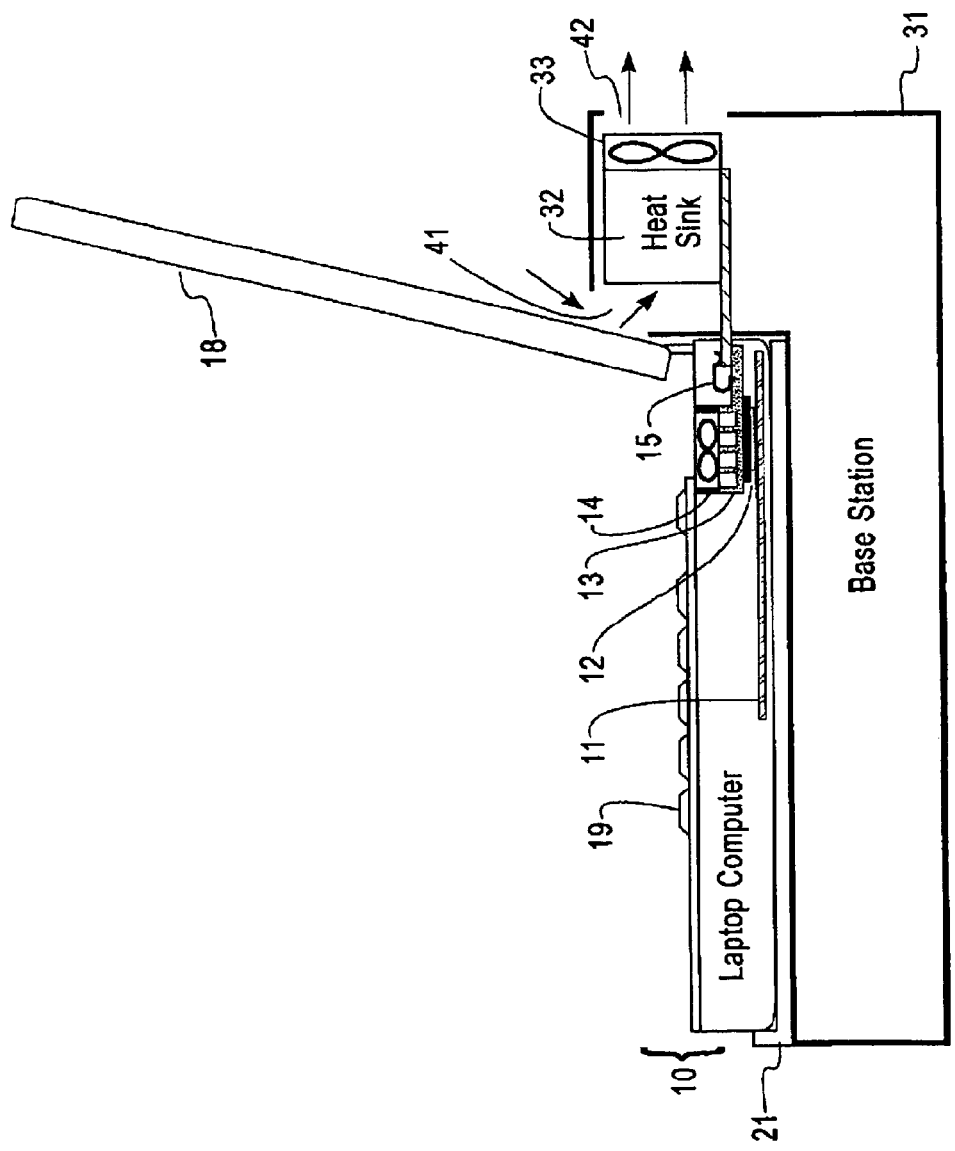
FIG. 2 is the schematic view of a laptop computer docked into the base.

Referring to FIG. 1, a laptop computer 10 has a printed wiring board 11 to which a CPU chip 12 is connected. A heat sink 13 is mounted on the top of the CPU chip 12. When the laptop computer is powered on heat generated in the CPU chip 12 is dissipated through the heat sink to outside of the laptop computer 10. An optional cooling fan 14 can be added to the top of the heat sink to boost its cooling capability. Because of the limitations of space and battery power in the laptop computers, the cooling fan 14 is generally small and has limited cooling power. The laptop computer can be docked into a base station 31 to get power and signal connections as well as other input/output extensions. FIG. 1 shows a laptop computer 10 with its display 18 in the closed position sitting on a sliding tray 21 waiting to be docked into the base station 31. (The term base station and docking station are used interchangeably herein. FIGS. 1-4 show an exemplary embodiment of a base station.) Both the laptop computer 10 and the base station 31 have connectors for electrical connection and will be interlocked together when the tray 21 is slid into the base station 31. These electrical connectors are typically on the side 15A of the laptop 10 which is pressed against a portion 15B of the docking station 31. Typically, the portable computer has an electrical connector which makes and engages with a connection on the docking station. These connectors are coming known in the art. The figure shows a means to provide cooling enhancement of the laptop computer 10 when it is docked into the base station 31. The heat conduction member 34 is mounted inside the base station 31. A heat sink 32 is placed in good thermal contact with the heat conduction member 34. A cooling fan 33 is attached to the end of the heat sink 32. Because the base station is usually powered by an AC power line and has larger housing, the size of heat sink 32 and the cooling fan 33 can be much larger than those in the laptop computer. As a result, their cooling capability is much higher than that of those in the laptop computer. In an exemplary embodiment, when the laptop computer 10 is docked and its display 18 is in the open position with the keyboard 19 exposed as shown in FIG. 2, the heat conduction member 34 will engage with the heat sink 13 in the laptop computer 10. The clamp-like member 15 on the heat sink 13 will ensure that the heat conduction member 34 is in good thermal contact with the heat sink 13. The cooling fan 33 will be turned on once the laptop computer 10 is fully docked. The cooling fan 33 will then pull the air in from the inlet 41 and force the air passing through the heat sink 32. The hot air will exhaust from the outlet 42. The arrows in the figure show the air moving direction as described. However, the direction of air movement can be designed to any ways to get the best cooling effects. The heat conduction member 34 is made of heat conductive materials such as copper or aluminum. A heat pipe can be embedded in the heat conduction member 34 to reduce the thermal resistance from the heat sink 13 to the heat sink 32.

Figure 3:
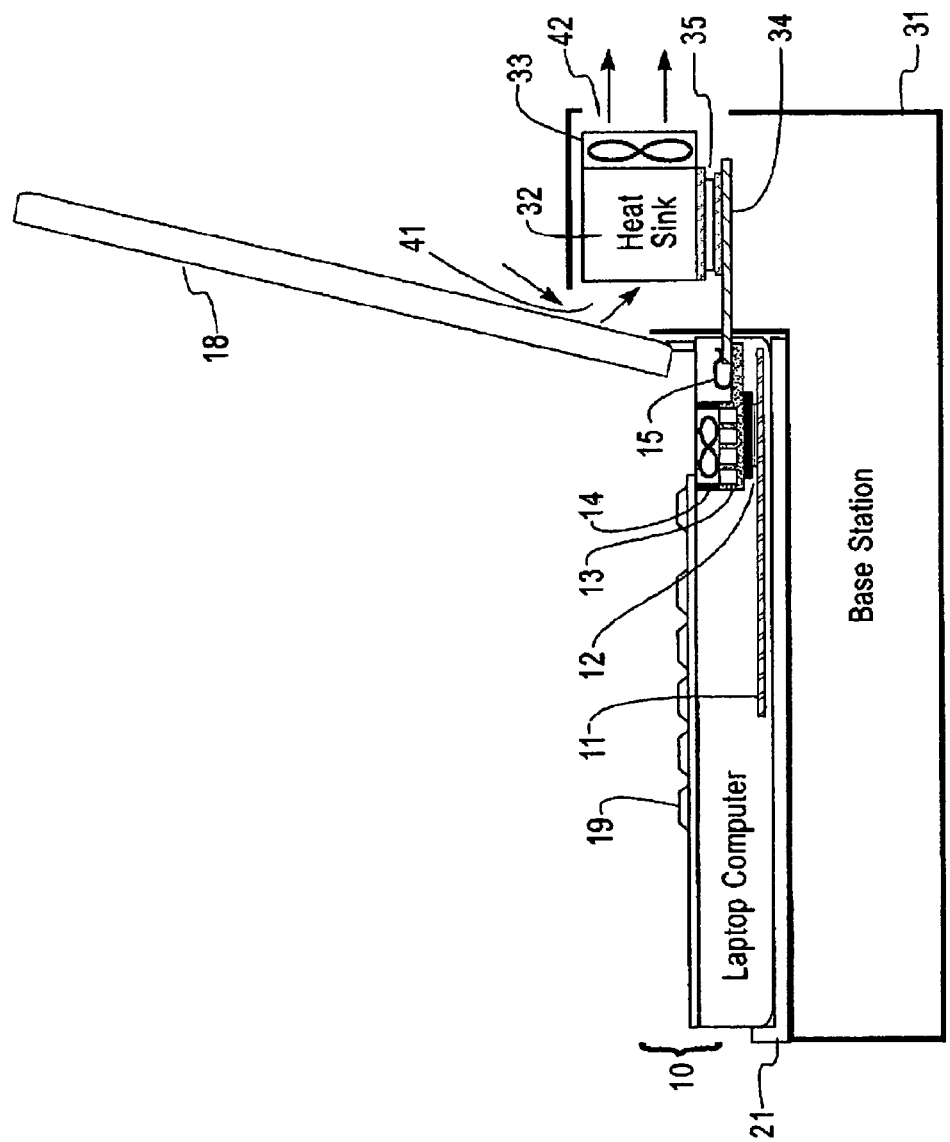
FIG. 3 is the schematic view of a laptop computer docked into the base enhanced with a thermo-electric cooler.

The cooling capability of the laptop computer can be increased further when it is docked into the base station with a thermoelectric cooler installed. As shown in FIG. 3, The thermo-electric cooler 35 is inserted between the heat conduction member 34 and the heat sink 32. A thermo-electric cooler is a well-known device in the field that uses Peltier effect to pump heat away from one side to the other when an electric current is applied. The thermo-electric cooler in this setup will help to improve the heat flow from the CPU chip 12 to the heat sink 32. If the heat pumping power of the thermo-electric cooler is large enough, the temperature of the CPU chip 12 can be brought down to close to or even below ambient room temperature. This is sometimes desirable since lowering the CPU temperature will increase its reliability and performance. However, since the heat pumping efficiency of the thermo-electric cooler is about 0.6 or below, the cooling capability of the heat sink 32 must be designed accordingly to dissipate the extra heat generated from the thermo-electric cooler.

Figure 4:
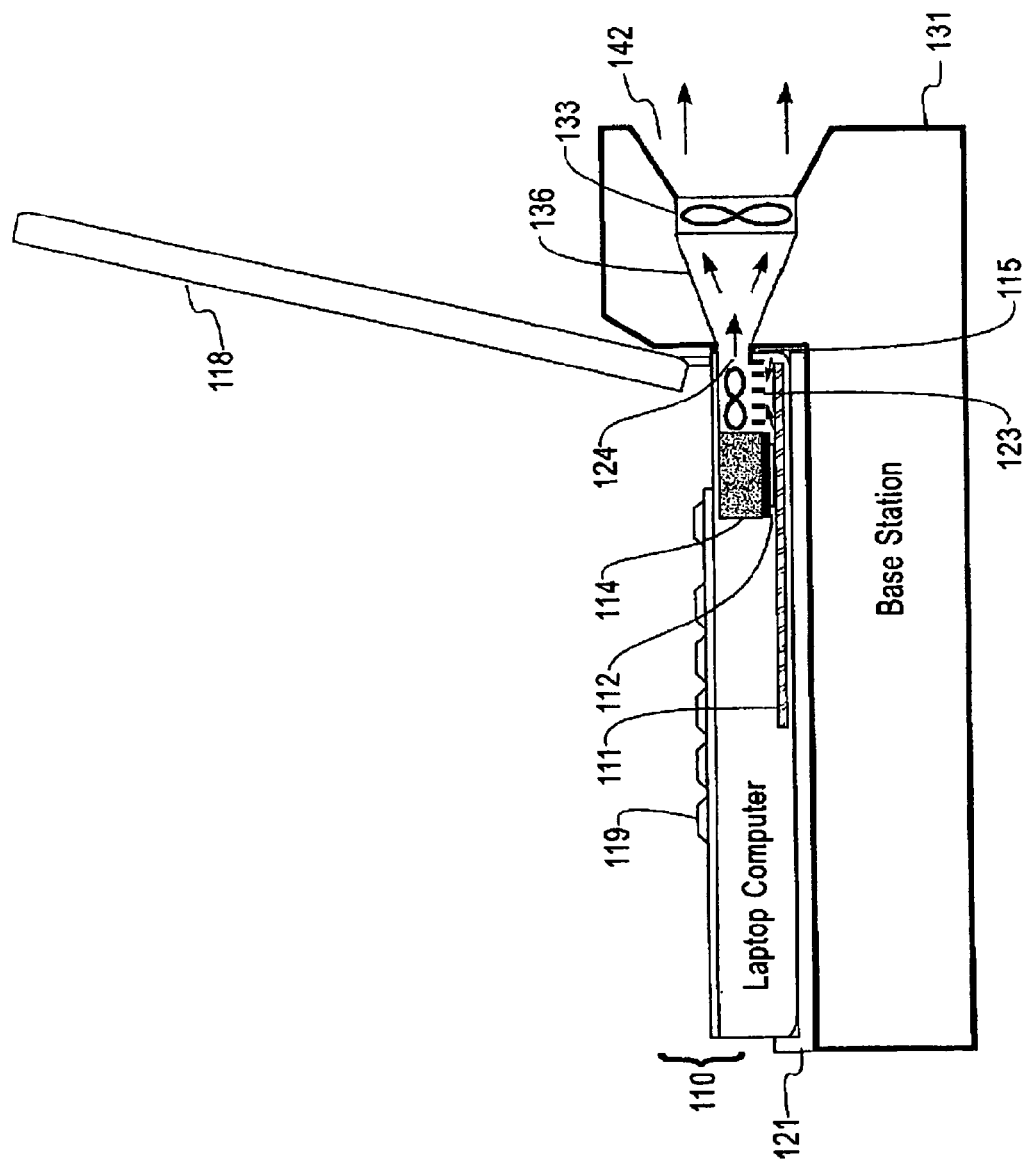
FIG. 4 is the schematic view of a laptop computer docked into the base with an air flow booster.

FIG. 4 shows another embodiment of the current invention of thermal enhancement of a laptop computer when it is docked in a base station. The laptop computer 110 is sitting on a sliding tray 121 on a base station 131. The figure also shows the keyboard 119 and the display 118 in the open position. Inside the laptop computer 110, the CPU chip 112 is connected on a printed wiring board 111. A flat unidirectional cooling fan 114 is mounted on top of the CPU chip 112. Air is coming in from the fan inlet 123 and exiting from the fan outlet 124. One example of this flat unidirectional fan is Panasonic Model UDQFC3E04. Because of the size of the fan is limited by the space available in the laptop computer 110, the amount of air movement and hence the cooling power is limited. When the laptop computer 110 is docked, however, the amount of air moving will be increased by connecting the unidirectional fan 114 to another relatively high-power fan 133 inside the base station 131. More air passing the fan 114, the more is its cooling power. An elastomer seal 115 is used to prevent any air leakage during docking.

FIGS. 2-4 show portable computer 12 inserted into base station 31 with the portable computer in the open position so that the portable computer screen and keyboard are exposed and available for use by a user. Alternatively, a larger standalone keyboard and display can be electrically connected to the base station by means of cables plugged into sockets on the base station.

Figure 5:
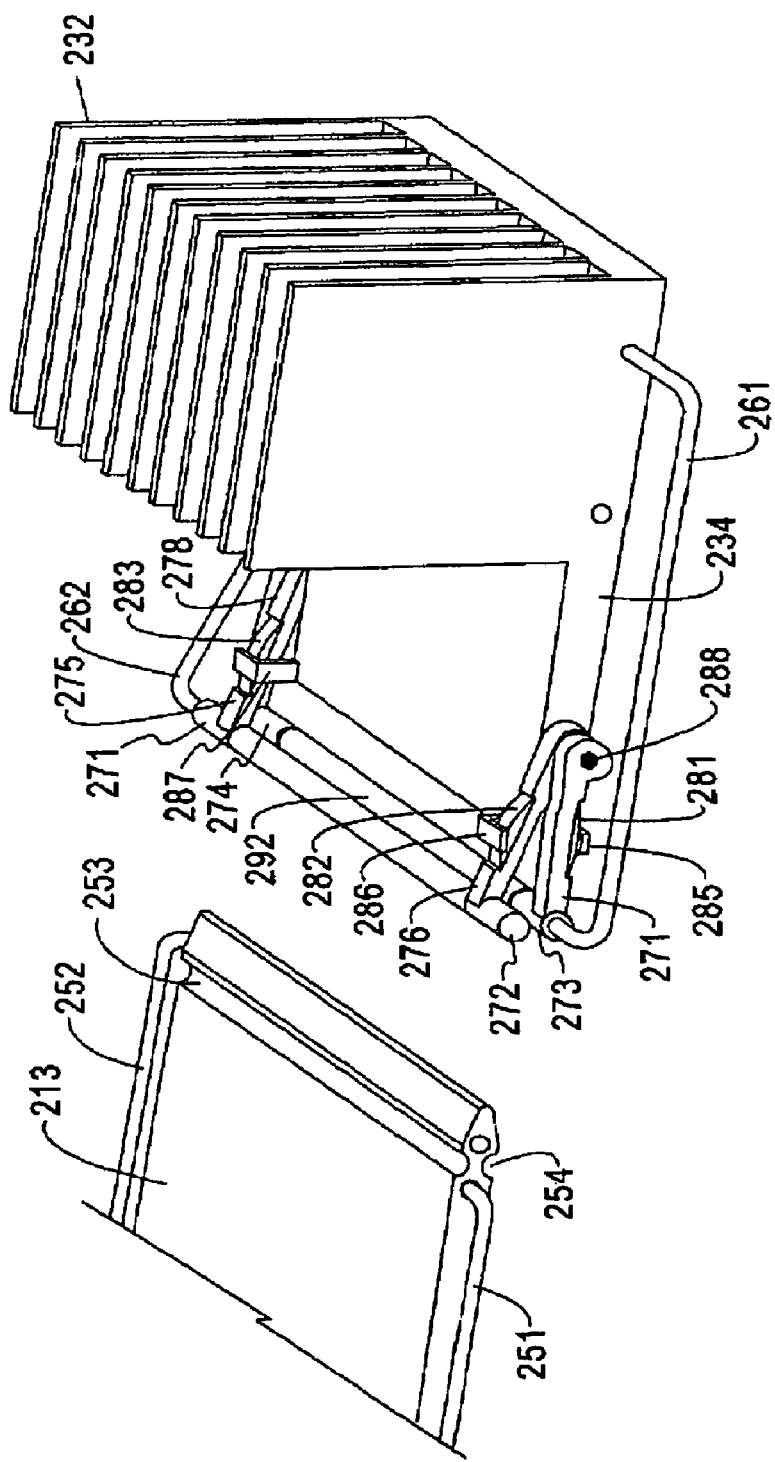
FIG. 5 is a schematic diagram of a heat-spreader useful with the present invention.

FIG. 5 shows another embodiment of a mechanism for engaging and disengaging a portable computer from thermal connection to an apparatus for dissipating heat which is part of the base station.

In FIG. 5, the head spreader 213, which is in good thermal contact with a heat generating semiconductor chip package such as a CPU (not shown in the figure), is enhanced with two heat pipes 251 and 252. Heat spreader 213 corresponds to the thermal clamp 15 of FIG. 1. One end of the heat pipes 251 and 252 are embedded near the tip of the heat spreader 213. The heat pipes are placed in parallel with the grooves 253 and 254. The heat spreader 213 are housed in a laptop computer. When the laptop computer is docked, the heat spreader 213 will be forced in between the two rotors 291 and 292 which are part of the receiving mechanism in the docking station. While in the docking position, the rotor 291 will be in the groove 253 and the rotor 292 will be in groove 254. In FIG. 5, the heat spreader 213 is on the left side and the receiving mechanism and the heat sink are on the right hand side. Two heat pipes 261 and 262 are used to carry the heat received from the rotors 291 and 292 to the heat sink 232. The rotors 261 and 262 are held by the supporters 271, 272, 273 and 274, respectively. The rotors 261 and 262 are free to rotate along the common axis defined by the supporters. The tip portion of the heat pipes 261 and 262 is placed inside the rotors 292 and 292 coincided with their common axis, respectively. Lubrication greases are added within the rotors to improve heat transfer from the rotors to the heat pipes and also reduce the friction between them. The supporters 271, 272, 273 and 274 are in turn supported by the holders 275, 276, 277 and 278, respectively. The holders 276 and 277 are mounded on one side of the bottom plate 234 and free to rotate along their common anchor point 288. The rotational angle of holders 276 and 277 are constrained by the two stoppers 285 and 286 and the two strip springs 281 and 282 which will provide the needed clamping force to the two rotors 291 and 292 while in the docking position. Similar arrangement applied to the two holders 275 and 278. The other end of the heat pipes 261 and 262 are placed under the heat sink 232. There are two ways to join this part of the heat pipes to the bottom plate 234. If the heat pipes are long and flexible enough, the heat pipes can be soldered or epoxied to the bottom plate 234. If the heat pipes are too rigid to bend, the heat pipes are inserted into holes filled with lubrication greases and allowed to rotate when the rotors 291 and 292 move during docking. A cooling fan which is not shown in the figure can be mounted on the heat sink 232 to boost its cooling capacity.

Figure 6:
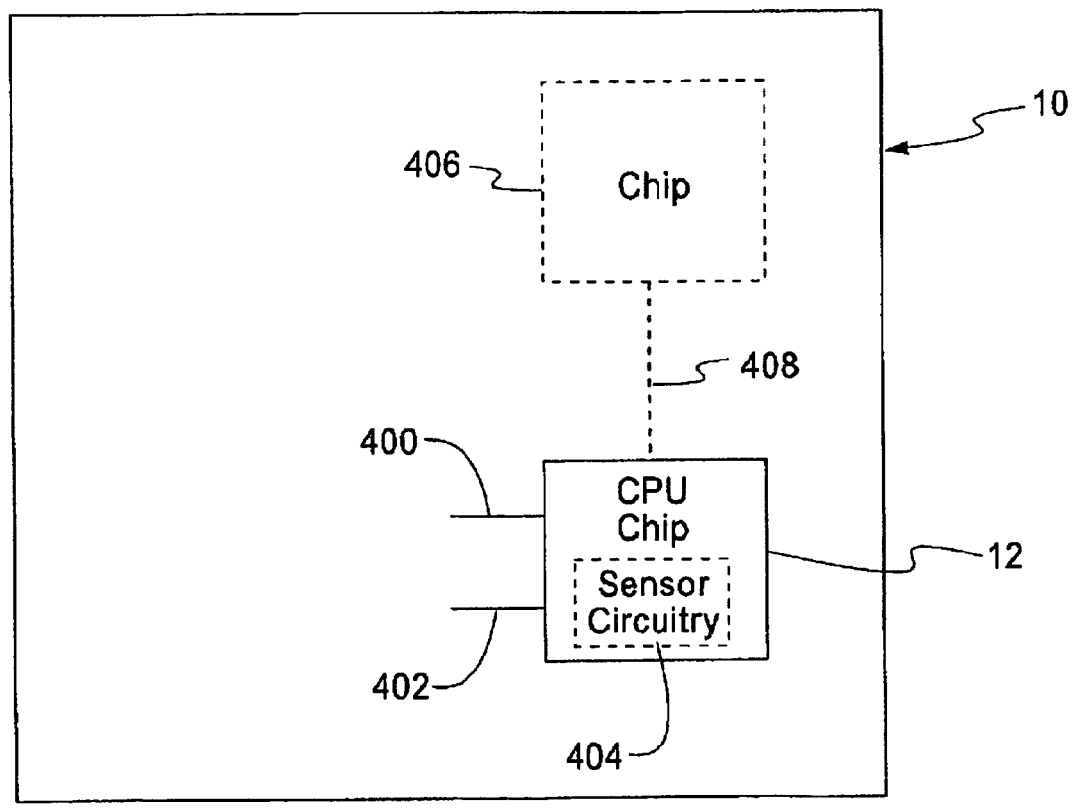
FIG. 6 schematically shows a portable computer with a CPU having a clock input and an input to control the clock to change the power mode of the CPU.

Chip 12 of FIGS. 1-3 and chip 112 of FIG. 4 are preferably a CPU chip having at least one low power mode of operation and at least one high power mode of operation. When chip 12 is referred to herein, unless stated otherwise, since chip 112 is analogous. Thus comments about chip 12 also apply to chip 112. An example of a chip useful to practice the present invention is Intel® Chip 2371AB (Trademark of Intel Corp.) which is described in documentation available from Intel Corporation dated April 1997 with order number: 290562-001, the teaching of which is incorporated herein by reference. This chip is a control chip controlling the CPU/memory, peripherals and busses. the description below refers to CPU chip 12 having inputs to control the speed at which the chip runs. This can be done using a control chip such as the Intel chip. FIG. 6 schematically shows portable computer 10, having CPU chip 12 which has clock input 400 and a throttle control input 402 which is used to control the duty cycle of the clock or the amount of time for which the clock is on and thus the power consumption of chip 12. Circuitry is provided in the portable computer 10, for example on chip 12 (schematically shows as dashed box 404), which senses whether or not the portable computer 10 is inserted or not inserted into electrical engagement with base station 31. Such sensing circuits are commonly used in the art. (Optionally, the sense circuit can be on another element such as chip 406 which is electrically connected as indicated by 408 to chip 12. Elements 406 and 408 are shown dashed in the FIG. 6 since they are optional.) For example, when a computer is turned on, a test is done to determine which peripheral devices, such as a keyboard, display and a printer, are attached thereto. Also, a peripheral device can be electrically connected to a computer which is in the on mode. For example, a cable from a printer can be inserted to a port on the computer which is provided for electrically connecting a peripheral device. When this happens, the computer senses that the peripheral device is electrically connected, the peripheral device is initialized and the computer can send and receive data to and from the peripheral device. Such commonly available circuitry can be used by the portable computer 10 to sense the electrical connection to the base station 31. When the circuit senses that the portable computer 10 is electrically connected to the base station 31, a signal is provided to switch the chip 12 from the low power to the high power mode of operation. The Intel 82371AB has a system throttle control which permits this chip to be toggled. The Intel 82371AB system throttle control has an input (TH-TL_DTY) which is programmed to control the duty cycle of the input clock signal to the chip 12 which is controlling the speed of chip 12. By controlling the duty cycle at which the chip 12 functions at, the power dissipated by the chip can be controlled. When the portable computer 10 is not in electrical connection with the base station 31, this input can be set for a low power mode of operation. When the portable computer 10 is inserted in electrical connection with the base station 31, this input can be set for a higher power mode of operation.

As described above, the additionally heat generated as a result of this higher power mode of operation is dissipated by the cooling mechanism provided with the base station.

Alternatively, the chip 12 can have a clock input which can be modified by setting an input to the chip 12. For example, the clock input can be multiplied by a predetermined amount so that the clock rate of the chip 12 can be set to be at a low clock rate which corresponds to a low power mode of operation or at a high clock rate which corresponds to a high power mode of operation. (Different multipliers correspond to different power levels.) Chips having an input to set the multiplier between at least two values are currently available. For example, Intel® Pentium® Processor With MMX™ Technology (Trademarks of Intel Corp.) which is described in documentation available from the Intel Corp. dated June 1997 Order Number 243185.004 the teaching of which is incorporated herein by reference. The inputs BF1 and BF2 are set to a 0 or 1 value to select from a number of modes of operation. The sense circuit which senses whether or not the portable computer 10 is in electrical engagement with the base station 31, results in setting the input to the chip 12 to change the degree of multiplication and thereby the clock rate at which the chip 12 operates.

Figure 7:
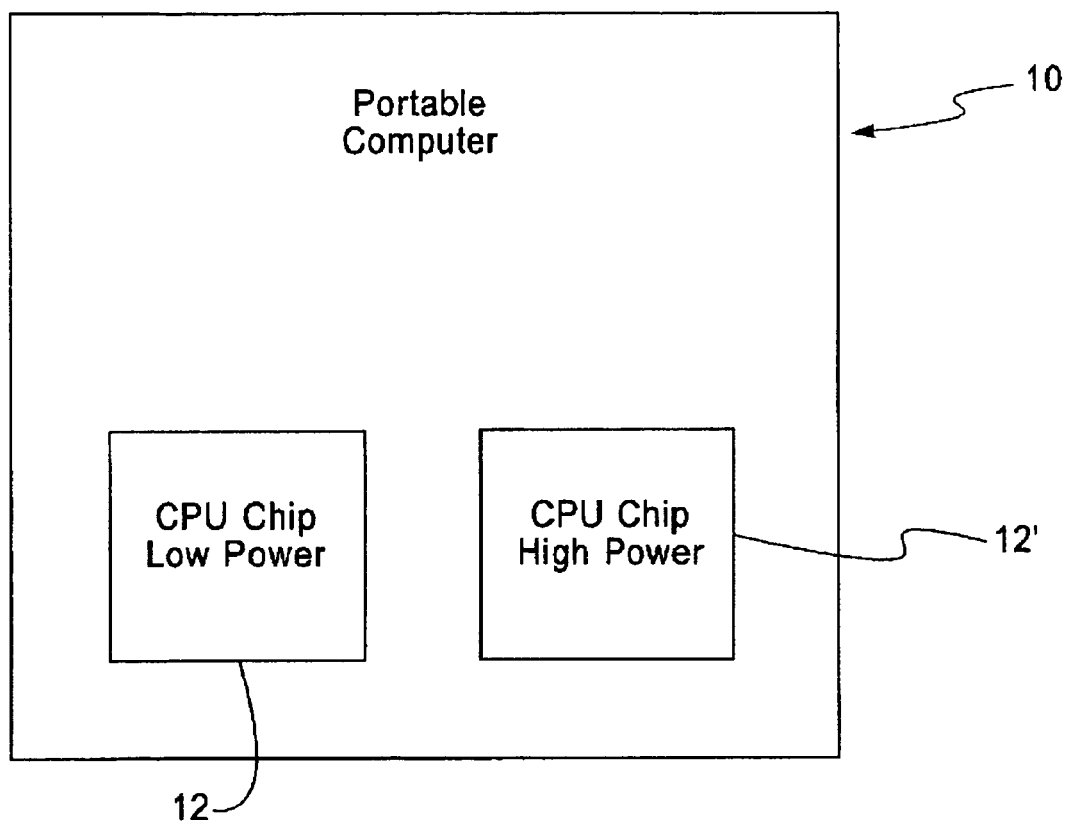
FIG. 7 schematically shows a portable computer having more than one CPU.

Alternatively, such as schematically shown in FIG. 7, the portable computer 10 can have a first CPU chip 12 which operates at a low power and can have a second CPU chip 12 which operates at a high power mode (or any number of CPUs to operate in many different power modes). When the portable computer 10 is not in electrical engagement with the base station 31, the low power CPU chip 12 controls the function of the portable computer 10. When the portable computer 10 is inserted in electrical engagement with the base station 31, the high power chip controls the operation of the portable computer 10. The sense circuit which senses whether or not the portable computer 10 is inserted in electrical engagement with the base station 31 selects whether the high power mode chip or the low power mode chip controls the function of the portable computer 10.

Figure 8:
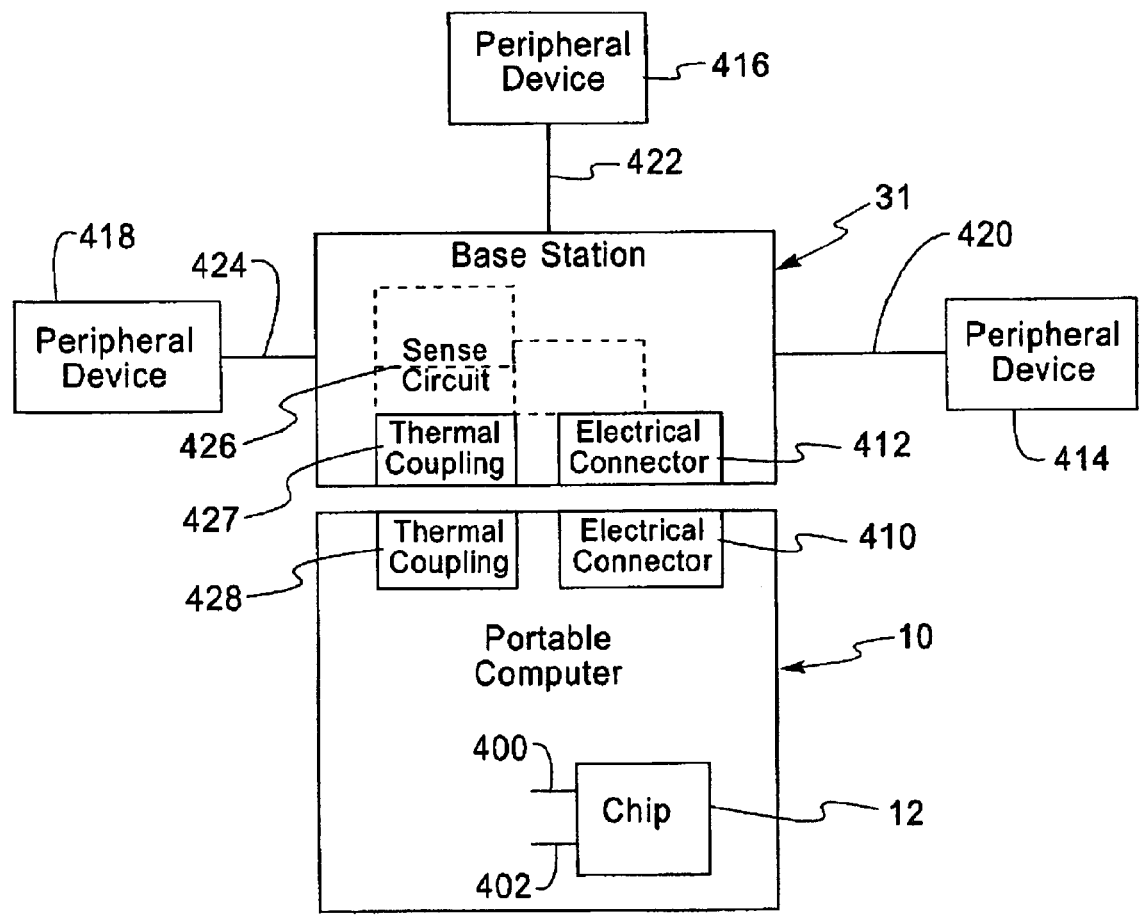
FIG. 8 schematically shows a portable computer engaged in a base station with peripheral devices attached.

In an alternative embodiment, the circuit which senses whether the portable computer 10 is in electrical engagement with the base station 31, can be in the base station 31. FIG. 8 schematically shows base station 31 in electrical engagement with portable computer 10 through electrical connection of electrical connector 412 on base station 31 to electrical connector 410 on portable computer 10. FIG. 8 also shows optional electrical connection of peripheral devices 414, 416 and 418 by electrical connections 420, 422 and 418, respectively to base station 31. The peripheral devices can be any devices, such as a keyboard, display, printer, LAN connection, modem, telephone system connection, and internet connection. Sense circuit 426 shown as a dashed box is optionally in base station 426. Base station 31 has thermal coupling 427 and portable computer has thermal coupling 428. Thermal couplings 427 and 428 are disengageable for thermally connecting and disconnecting base station 31 and portable computer 10. Examples of thermal couplings 427 and 428 are given above. When the portable computer 10 is engaged electrically with the base station 31, the sense circuit of the base station 31 sends a signal to the chip 12 through the electrical connection between the portable computer 10 and the base station 31. The signal places the chip 12 in the high power mode of operation or results in the selection of the high power mode chip. The sense circuit when it is in the portable computer 10 can optionally be on the chip 12 or is part of another component such as another chip which is electrically connected to the chip 12. Alternatively, a user of the system can, by entering an appropriately designed set of key strokes at the keyboard, change the mode of operation at which the chip 12 operates.

Figure 9:
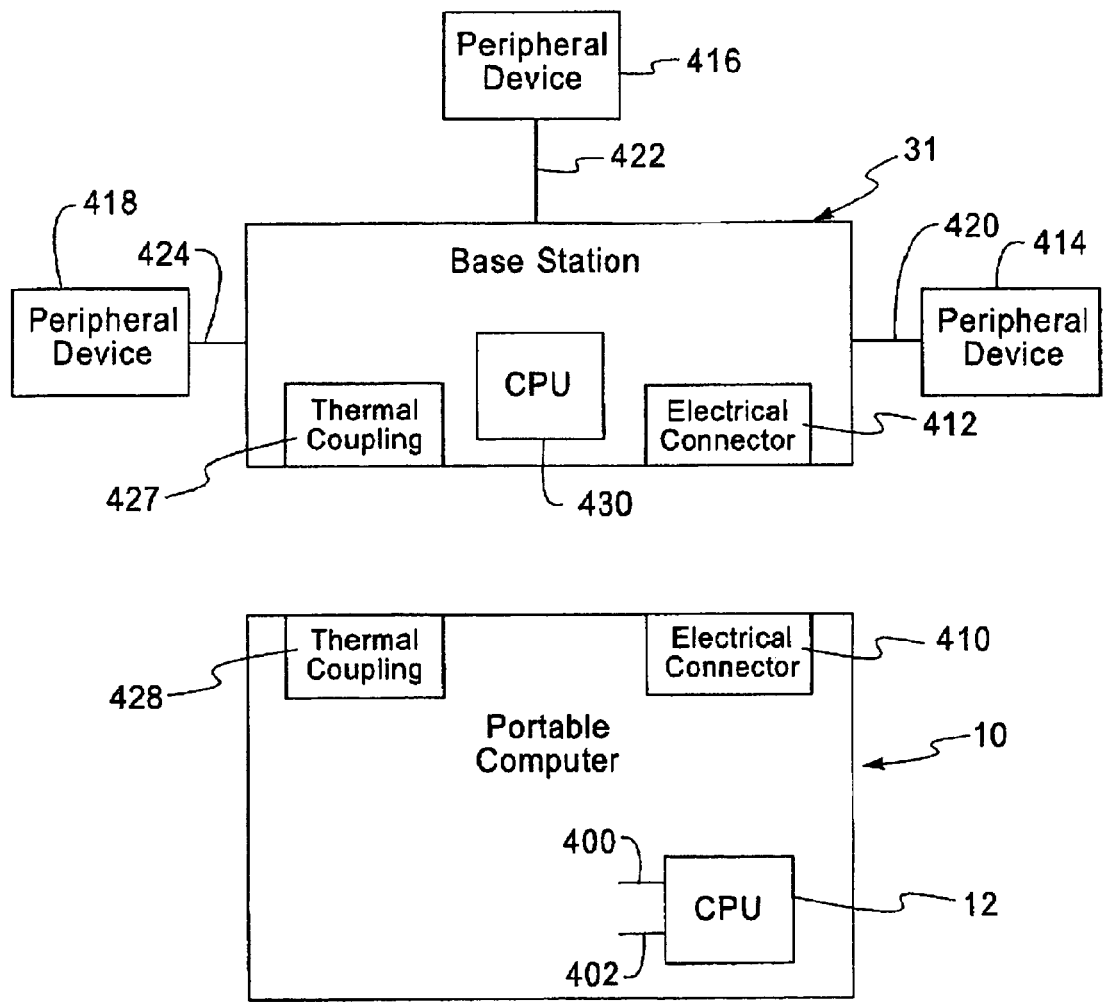
FIG. 9 schematically shows a portable computer and base station which has its own CPU.

FIG. 9 shows portable computer 10 and base station 31. The base station 31 has its own CPU 430. The CPU 12 of the portable computer 10 can be a low power CPU which can control the function of portable computer 10 when it is not engaged in electrical connection with base station 31. Base station 31 can have its own CPU 430 which can be a high power CPU. Either base station 31 or portable computer 10 can have sense circuit to sense whether portable computer 10 is electrically engaged or not to base station 31. When the portable computer 10 is electrically engaged with base station 31, high power chip 430 controls the operation of portable computer 10. The circuitry to switch control from low power chip 12 to high power chip 430 can be either in the portable computer 10 or base station 31. Alternatively, chip 12 can be a chip as described above having at least a high and low power mode of operation. (Such a chip can have a plurality of modes of operation) and chip 430 can be a CPU chip sufficient to provide the base station 31 with minimal functionality or the chip 430 can have any desired degree of functionality. For purposes of minimal cost, chip 430 is preferably a chip which provides sufficient functionality to the base station 31 so that the base station 31 without the portable computer electrically engaged to it has a degree of functionality sufficient for the base station alone to provide a user with some useful function. For example, if a user forgets to bring the portable computer to the location of base station 31 such as when a user brings portable computer 10 home from the user's office and forgets to bring the portable computer 10 back to the office when the user returns to the office, base station 31 alone provides the user with some limited functions. An exemplary list of limited functions which the base station 31 alone can provide are e-mail access, connection to the internet and word processing capability. Such a base station permits a user to perform work assignments without the full work station capability provided by the portable computer-base station combination.

Additionally, the power mode of CPU 12 or CPU 426 can be controlled by the temperature of the CPU. The clock throttling signal and/or clock frequency can be adjusted to run the CPU according to the maximum allowable temperature of the CPU as described above and provided by Intel® Chip 82371AB.

While this invention has been described in terms of certain embodiment thereof, it is not intended that it be limited to the above description, but rather only to the extent set forth in the following claims. The embodiments of the invention in which an exclusive property or privilege is claimed are defined in the appended claims. The teaching of all references cited herein are incorporated herein by reference.

The invention claimed is:

1. A method of fabrication an apparatus comprising:
   providing a portable computer;
   providing a docking station;
   said portable computer comprises a low performance mode of operation and a high performance mode of operation;
   providing a sensor for sensing if said portable computer is engaged in said docking station, or if said portable computer is not engaged in said docking station;
   both said high and said low performance modes of operation are actively user usable modes of operation;
   providing a signal generator for switching said computer between said high performance mode of operation and said low performance mode of operation in response to an input;
   said input being selected from the group consisting of an output of said sensor indicating that said portable computer is engaged with said docking station and for switching said portable computer into said high performance mode of operation and an output of a temperature sensor which monitors the operating temperature of said computer to switch said computer between said high performance mode of operation and said low performance mode of operation;
   said portable computer comprises a low performance CPU comprising said low performance mode of operation and said docking station comprises a high performance CPU comprising said high performance mode of operation, wherein said low performance mode CPU is not the same CPU as said high performance CPU; said signal generator switches said computer between said high performance mode of operation using said high performance CPU, and said low performance mode of operation using said low performance CPU in response to said input;
   providing said portable computer with a portable computer cooling system;
   providing said docking station with a docking station cooling system for engagement and disengagement with said portable computer cooling system for enhanced cooling of said portable computer when engaged with said docking station and operating in said high performance mode of operation through said high performance CPU and for reduced cooling of said portable computer when disengaged from said docking station and operating in said low performance mode of operation through said low performance CPU; and
   providing said engaged cooling system with a first air blower in said portable computer coupled to a first air port in said portable computer and to a heat sink in said portable computer, a releasable clamp for providing physical and thermal engagement between said portable computer and said docking station, said releasable clamp is physically and thermally coupled to and surrounding a heat pipe, providing thermal contact between said heat sink and said heat pipe permitting releasable clamp permitting engagement and disengagement of said heat pipe and said heat sink, providing said heat pipe is thermally coupled to a heat sink in said docking station, providing said heat sink in said docking station is thermally coupled to a second air blower in said docking station for causing airflow over said heat sink in said docking station, providing said releasable clamp which permits said engaged cooling system to provide a higher heat dissipation capacity to said portable computer when operating in said high performance mode of operation from said high performance CPU than the maximum heat dissipation capacity provided by said first air blower to said portable computer when operating in said low performance mode of operation from said low performance CPU, and said releaseable clamp when clamped to and surrounding said heat conduction member cannot be released without being disengaged, when engaged said releasable clamp exerts a compressive force on said heat conduction member.

* * * * *